Patented Jan. 12, 1954

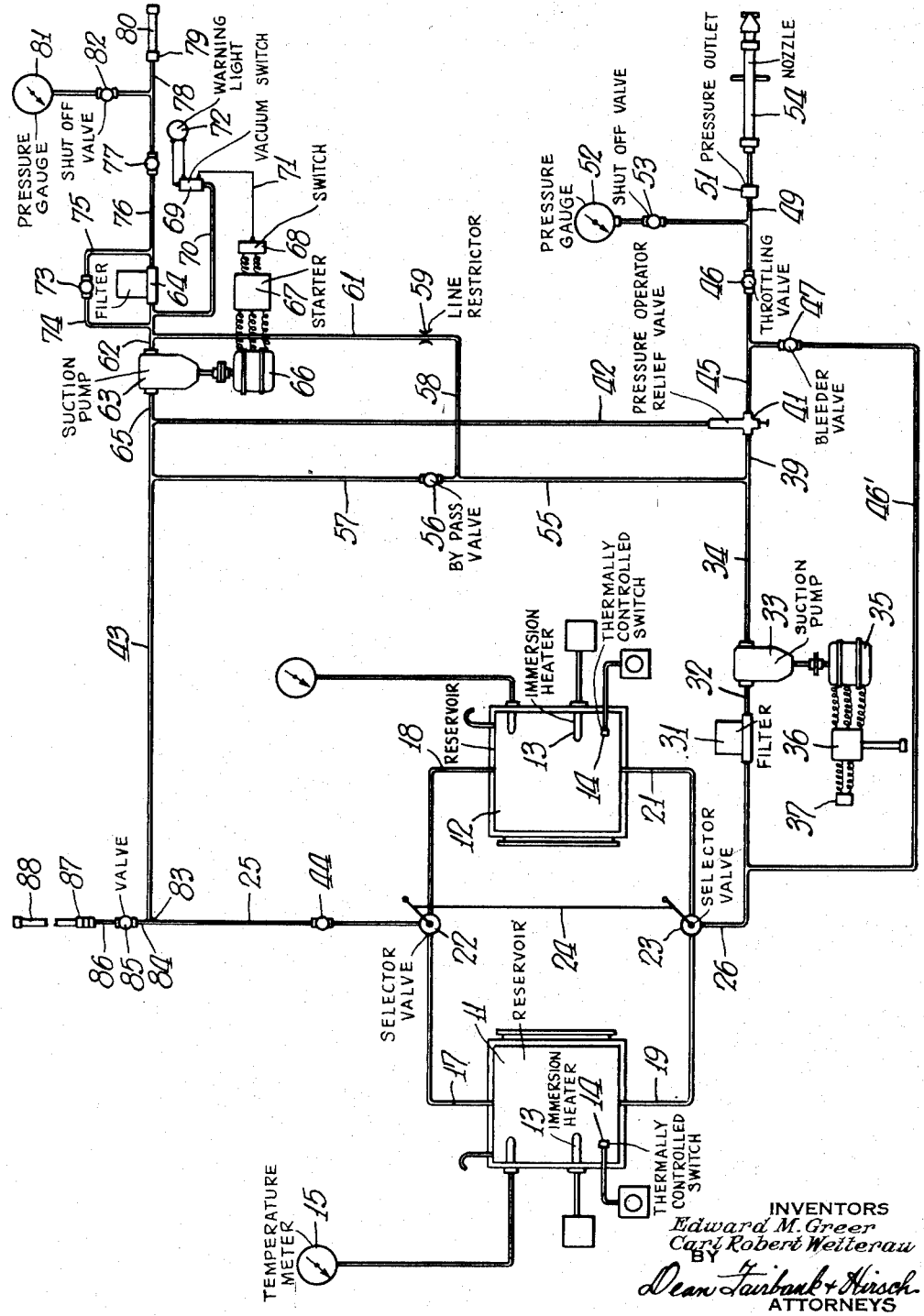

2,665,772

UNITED STATES PATENT OFFICE 2,665,772

SERVICING EQUIPMENT FOR LUBRICATING SYSTEMS

Edward M. Greer, West Hempstead, and Carl Robert Wetterau, Huntington, N. Y., assignors to Greer Hydraulics, Inc., Brooklyn, N. Y., a corporation of New York Application June 4, 1951, Serial No. 229,801

10 Claims. (Cl. 184—1.5)

1

This invention relates to servicing equipment and more particularly to an equipment for cleaning the lubricating system of an aircraft and filling such system with oil.

As conducive to an understanding of the invention, it is noted that when the oil utilized in the lubricating system of aircraft becomes contaminated and breaks down with use, in order completely to clean the lubricating system before fresh oil is put therein, it is generally flushed with a suitable liquid. After this is done, the lubricating system is thereupon charged with oil in conventional manner. Where the cleaning and charging of the lubricating system requires the use of several servicemen and considerable equipment which must be disconnected and reconnected, the operation is time-consuming and difficult. In addition, where the engine of an aircraft has been standing idle in cold climate, the lubricating oil used therein often becomes highly viscous or even freezes and the engine cannot be used until such oil is heated sufficiently to flow freely through the system.

It is accordingly among the objects of the invention to provide a relatively simple, compact equipment which requires the use of but a single attendant and by the use of which the lubricating system of an aircraft may be cleaned and replaced with fresh oil without need for disconnecting the equipment until servicing of the aircraft has been completed.

Another object is to provide an equipment for warming the aircraft engine without need for complicated and bulky tents or heating equipment other than that used to heat the oil to be used in the lubricating system itself.

According to the invention, the equipment desirably comprises a pair of reservoirs, one of which carries a flushing liquid for cleaning the lubricating system of the aircraft, and the other of which carries lubricating oil for such lubricating system.

The reservoirs are suitably connected through selector valves so that either one or the other thereof may be connected to the lubricating system through a suitable pump which will force such liquid into such lubricating system. The equipment includes a suction pump which may be connected to a discharge outlet of the lubricating system to circulate the liquid through such system and force such liquid back into the reservoir which is connected to such system.

In the accompanying drawings, in which is shown one of various possible embodiments of the several features of the invention, the single figure is a diagrammatic view of the servicing equipment.

The components which form the equipment now to be described may be mounted on a suitable truck or wagon (not shown), so that the unit may be transported from place to place as desired.

Referring now to the drawings, the equipment desirably comprises a pair of liquid reservoirs 11 and 12 which may be substantially identical in construction. Each of the reservoirs desirably has an immersion heater 13 therein, controlled by means of a suitable thermally controlled switch 14 which may be set for any desired temperature, a meter 15 associated with each reservoir indicating the temperature of the contents thereof.

The reservoirs 11 and 12 each has an inlet line 17 and 18 and an outlet line 19 and 21 which are connected, respectively, to selector valves 22 and 23, desirably ganged together as at 24 so as to operate in unison, said valves having a return line 25 and a feed line 26 connected thereto respectively. Each of the selector valves is desirably of the type which permits either one of the reservoirs to be cut off while the other is connected to the return line 25 and the feed line 26.

The feed line 26 is desirably connected to a filter 31 and thence by line 32 to a pump 33 which draws liquid from the feed line 26 and the reservoir connected thereto, and forces such liquid through line 34. The pump may be driven by suitable means such as an electric motor 35 controlled through a starter 36 by means of a push button 37.

Line 34 is connected through line 39 to a pressure operated relief valve 41 which has a line 42 connected thereto and leading into a line 43 which in turn leads back to return line 25, the latter desirably having a shut-off valve 44 therein. Valve 41 also has a line 45 connected thereto which leads into a main throttling or control valve 46. The output of valve 46 is desirably connected by line 49 to a pressure outlet 51, a pressure gauge 52 being connected to line 49 through a shut-off valve 53. In order that the output of liquid from pressure outlet 51 may be concentrated in a controlled stream, a nozzle 54 of any suitable type is desirably connected thereto. A bleeder valve 47 is desirably interposed in line 45 and connected by line 45' to feed line 26 so that the liquid in line 49 leading to the nozzle may be drawn by gravity back into the reservoir 11 or 12.

The line 34 from the pump 33 is also connected through a line 55 to a main by-pass valve 56 which in turn is connected by line 57 to line 43. In addition, line 55 is connected by line 58, a line restrictor 59 and line 61 to a line 62 which connects the inlet end of a suction pump 63 to the outlet of a filter 64, the outlet of said pump being desirably connected by line 65 to the line 43.

Although the pump 63 may be of any suitable type, it desirably is of the gear type, driven by means of a suitable electric motor 66 controlled through a starter 67 by means of a switch 68. A vacuum switch 69 is desirably connected by line 70 to the outlet of filter 64 to control switch 68 through lead 71, switch 69 desirably having a warning light 72 connected thereto to indicate when the switch has functioned.

The filter 64, which desirably has a normally closed valve 73 connected thereacross by lines 74 and 75, has its inlet connected by line 76 to a shut-off valve 77, the latter being connected by line 78 to a suction connection 79, which may have a suitable hose 80 connected thereto, a pressure gauge 81 being connected to line 78 through a shut-off valve 82.

To complete the system, the junction 83 between lines 25 and 43 is connected by line 84 through valve 85 and line 86 to a discharge outlet 87 which may have a suitable hose 88 connected thereto.

*Operation*

Although the equipment above described may be used in many ways, it is especially designed for use in servicing the oil lubricating system of an aircraft.

To this end, the operator or serviceman need merely open the cover of the oil tank (not shown) in the lubricating system of the aircraft and insert the nozzle 54 thereinto. The hose 80 is then connected to a discharge outlet (not shown) which may be in the return line of the lubricating system, said return line being commonly provided with valve means to cut off the oil tank from such return line, or such discharge outlet may be at some point in the lubricating system between the various elements that are being lubricated. The flushing liquid in the reservoir 11 may then be heated by connecting the immersion heater 13 to a source of potential, the thermally operated switch 14 maintaining the temperature of such liquid at any desired amount which will be indicated on the meter 15.

The equipment is then adjusted so that the selector valves 22 and 23 are in position to connect lines 17 and 19 of reservoir 11 to lines 25 and 26. The valve 44 is opened and valve 85 is closed as is the valve 73 by-passing the filter 64. The valves 46 and 56 are opened as far as possible, as are the valves 53 and 82

After the liquid in the reservoir 11 has heated sufficiently, as indicated on gauge 15, the motors 35 and 66 are energized by means of the associated switches 37 and 68. The energization of motor 35 will cause the pump 33 to draw the flushing liquid from reservoir 11 through line 19, selector valve 23, line 26, filter 31, line 32, pump 33, lines 34 and 39, through relief valve 41, line 45 and valve 46 to line 49 which is connected to the outlet 51 so that the flushing liquid will be forced through nozzle 54 into the oil tank of the aircraft.

The main by-pass valve 56 is thereupon adjusted, slightly to close the latter to decrease the flow of liquid through line 57 back to the tank 11. As a result, a greater volume of liquid will be forced through the nozzle 54 and this will be indicated by an increase of pressure on the gauge 52, the valve 56 being adjusted until a desired pressure is indicated on said gauge 52.

In the event it is desired to have a relatively fine spray from the nozzle 54, with both the valves 56 and 46 wide open, such fine spray is not achieved. It is merely necessary to reduce the flow through valve 46 by slightly closing the latter until the desired pressure for such fine spray is indicated on gauge 52. With the flow of flushing liquid through nozzle 54 adjusted as desired, the serviceman may then move the nozzle 54 around in the tank in the aircraft thoroughly to clean the latter.

By reason of the suction pump 63 which is connected to the discharge outlet (not shown), of the lubricating system in the aircraft (illustratively the discharge outlet located in the return line of such lubricating system in which case a valve [not shown] in such return line is operated to cut off the oil tank therefrom), a suction will be created in the lubricating system of the aircraft which will cause the flushing liquid to be drawn from the oil tank and circulated through the lubricating system thoroughly to clean the latter. The flushing liquid will be drawn through the return outlet 79, line 78, normally open valve 77, line 76, filter 64, line 62 through suction pump 63, lines 65, 43, 25, open valve 44, selector valve 22 and line 17 back into the reservoir 11. As a result, a continuous circuit will be provided through which the flushing liquid may flow so that the lubricating system may be thoroughly cleaned.

By reason of the relatively large capacity of the reservoir 11 with respect to the capacity of the lubricating system, and by reason of the interposition of the filter 64, the flushing liquid may be used for a long period of time before it will become so contaminated and filled with debris that it can no longer be used.

In the event that the oil in the lubricating system of the aircraft before it is flushed, is cold and extremely viscous, it will not readily flow through the filter 64 upon operation of the suction pump 63, and as a result, the latter will build up an extremely high vacuum. To prevent injury to the pump, when the vacuum has built up to a predetermined amount, which will be indicated on gauge 81, it will, through line 70 operate the vacuum switch 69 to cut off the switch 68 and de-energize the suction motor 66, such cut-off being indicated by the warning lamp 72 associated with the vacuum switch. When this occurs, it will be necessary to stop the pump 35 and heat up the aircraft engine in conventional manner in order that the viscosity of the lubricating oil therein may be reduced.

Where the oil in the aircraft is of sufficiently low viscosity to flow through the lubricating system of the aircraft, yet too viscous to flow freely through filter 64, the vacuum switch 69 will also operate. In such case it is merely necessary for the serviceman to open valve 73, thereby to by-pass the filter. As a result the oil from the aircraft will flow through the system and after it has been gradually warmed up by the heated flushing liquid, the by-pass valve 73 may be again closed so that the filter 64 is again in the system.

In the event that no liquid should flow through the filter 64 or the by-pass valve 73 such as where the oil in the lubricating system of the plane is frozen, no oil would normally flow through the suction pump 63. As it is necessary that gear pumps of this type be lubricated at all times, means are provided to feed oil to the pump when no oil is flowing from the aircraft. Such means is afforded by the lines 58, 61 and line restrictor 59. Thus, in the event that the flow of liquid to the pump 63 should be cut off, the suction created by the pump will increase sufficiently to cause oil to flow from line 34 through line 55, line restrictor 59 and line 61 to the pump 63. As a result, the latter will always be lubricated.

After the lubricating system of the aircraft has been sufficiently cleaned, the operator need merely turn off motor 35. This will permit the suction pump 63 to drain substantially all of the flushing liquid from the lubricating system of the aircraft. At this time the operator then may move the selector valves 22 and 23 to connect the oil reservoir 12 to the system and cut off the reservoir 11. The pump 33 may then again be actuated by energizing motor 35 and as a result, oil which has been preheated to a desired temperature, will be forced into the oil tank of the aircraft to fill the latter and will be sucked through the lubricating system by the suction pump 63. After the oil tank is filled, as well as the lubricating system, the pumps 33 and 63 may be de-energized and the equipment disconnected from the aircraft and the discharge outlet in the return line of the lubricating system of the aircraft is closed and the cut off valve in such line is opened so that the oil tank will again be in communication with the return line for normal operation of the lubricating system. It is to be noted that if it is desired to drain the oil from the lubricating system of the aircraft without circulating it back into the liquid reservoir 11, it is merely necessary to shut off return valve 44 and open valve 85. As a result the oil will be forced by the suction pump 63 through lines 43, 84, valve 85 and outlet 87 through hose 88 into any suitable container.

With the equipment above described, the lubricating system of an aircraft may readily be cleaned and without need for disconnecting the equipment, a supply of fresh oil preheated to a desired temperature may be forced through the lubricating system to fill the latter.

The equipment is especially useful for aiding in the warm-up of aircraft in cold temperatures. In such cases, even though the engines may start, by reason of the freezing of the lubricating oil, the engine will not be lubricated and hence would become injured. It is consequently the usual practice to heat the engine by suitable means such as by placing a cover over the engine, so that it may be warmed with electric blowers or the like.

With the equipment above described, the aircraft when it is on the ground, may have its lubricating system drained. When it is desired to use the aircraft, it is merely necessary to force preheated oil from the reservoir 12 through the lubricating system of the aircraft and circulate such oil as previously described until the engine temperature has reached the desired amount. With this equipment the need for complicated and cumbersome tents to heat the aircraft is dispensed with as is the time and effort required for this purpose. The system herein described will effect the warming of the aircraft engine in but a short period of time and with the need of but a single operator.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment of the character described comprising a pair of reservoirs, each having an inlet and an outlet, a pump, a selector valve to connect either one or the other of said outlets to the input of said pump, a discharge line connected to the output of said pump, a control valve in said discharge line, a second pump, an intake line connected to the input of said second pump, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, and a valve in said by-pass line.

2. The combination set forth in claim 1 in which a pressure gauge is connected to said discharge line between the valve therein and the outlet end of said line.

3. Equipment of the character described comprising a pair of reservoirs each having an inlet and an outlet, a pump, a selector valve to connect either one or the other of said outlets to the input of said pump, a discharge line connected to the output of said pump, a second pump, an intake line connected to the input of said second pump, a return line connected to the output of said second pump, a second selector valve to connect said return line to either one or the other of said inlets, whereby liquid may be forced into the associated reservoir, a pressure relief valve in said discharge line between the output of said first pump and the outlet end of said line and a pressure relief line connected at one end to said pressure relief valve and at its other end to the return line between the output of said second pump and said second selector valve.

4. Equipment of the character described comprising a pair of reservoirs, each having an inlet and an outlet, a pump, a seelctor valve to connect either one or the other of said outlets to the input of said pump, a discharge line connected to the output of said pump, a control valve in said discharge line, a second pump, an intake line connected to the input of said second pump, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, a valve in said by-pass line, a pressure relief valve in said discharge line between the output of said first pump and the control valve in said discharge line and a pressure relief line connected at one end to said pressure relief valve and at its other end to the return line between the output of said second pump and said second selector valve.

5. Equipment of the character described comprising a pair of reservoirs, each having an inlet and an outlet, a pump, a selector valve to connect either one or the other of said outlets to the input of said pump, a discharge line connected to the output of said pump, a control valve in said discharge line, a second pump, an intake line connected to the input of said second pump, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, a valve in said by-pass line, and a lubricating line connected at one end to said by-pass line between the valve therein and said discharge line and at its other end to said intake line adjacent the input of said second pump.

6. Equipment of the character described comprising a pair of reservoirs each having an inlet and an outlet, a pump, a selector valve to connect either one or the other of said outlets to the input of said pump, a discharge line connected to the output of said pump, a second pump, an electric motor to drive said second pump, an intake line conected to the input of said second pump, a filter in said intake line between the inlet end thereof and the input of said second pump, a line by-passing said filter, a valve in said by-passing line, a vacuum safety switch, a line connecting said safety switch to the input of said second pump and electrical means from said safety switch to said electric motor to de-energize the latter when said safety switch is actuated, a return line connected to the output of said second pump, and a second selector valve to connect said return line to either one or the other of said inlets, whereby liquid may be forced into the associated reservoir.

7. Equipment of the character described comprising a pair of reservoirs, each having an inlet and an outlet, a pump, a selector valve to connect either one or the other of said outlets to the input of said pump, a discharge line connected to the output of said pump, a control valve in said discharge line, a second pump, an intake line connected to the input of said second pump, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, a valve in said by-pass line, a pressure relief valve in said discharge line between the output of said first pump and the control valve in said discharge line, a pressure relief line connected at one end to said pressure relief valve and at its other end to the return line between the output of said second pump and said second selector valve and a lubricating line connected at one end to said by-pass line between the valve therein and said discharge line and at its other end to said intake line adjacent the input of said second pump.

8. Equipment of the character described comprising a pair of reservoirs, each having an inlet and an outlet, a pump, a selector valve to connect either one or the other of said outlets to the input of said pump, a discharge line connected to the output of said pump, a control valve in said discharge line, a second pump, an intake line connected to the input of said second pump, a filter in said intake line between the inlet end thereof and the input of said second pump, a line by-passing said filter, a valve in said by-passing line, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, a valve in said by-pass line, a pressure relief valve in said discharge line between the output of said first pump and the control valve in said discharge line, a pressure relief line connected at one end to said pressure relief valve and at its other end to the return line between the output of said second pump and said second selector valve, and a lubricating line connected at one end to said last-named by-pass line between the valve therein and said discharge line and at its other end to said intake line between the input of said second pump and said filter.

9. Equipment of the character described comprising a pair of reservoirs, each having an inlet and an outlet, a pump, a selector valve to connect either one or the other of said outlets to the input of said pump, a discharge line connected to the output of said pump, a control valve in said discharge line, a second pump, an electric motor to drive said second pump, an intake line connected to the input of said second pump, a filter in said intake line between the inlet end thereof and the input of said second pump, a line by-passing said filter, a valve in said by-passing line, a vacuum safety switch, a line connecting said safety switch to the input of said second pump, electrical means from said safety switch to said electric motor to de-energize the latter when said safety switch is actuated, a return line connected to the output of said second pump, a second selector valve to connect said return line to either one or the other of said inlets of said reservoirs, whereby liquid may be forced into the associated reservoir, a by-pass line connected at one end to said discharge line between the output of said first pump and the control valve in said discharge line and connected at its other end to the return line between the output of said second pump and said second selector valve, a valve in said last-named by-pass line, a pressure relief valve in said discharge line between the output of said first pump and the control valve in said discharge line, a pressure relief line connected at one end to said pressure relief valve and at its other end to the return line between the output of said second pump and said second selector valve, and a lubricating line connected at one end to said in and said discharge line and at its other end last-named by-pass line between the valve therein and said discharge line and at its other end to said intake line between the input of said second pump and said filter.

10. The combination set forth in claim 9 in which said lubricating line has a line restrictor therein.

EDWARD M. GREER.
CARL ROBERT WETTERAU.

References Cited in the file of this patent

UNITED STATES PATENTS

| Number | Name | Date |
|---|---|---|
| 1,892,093 | Battistella | Dec. 27, 1932 |
| 2,187,413 | Boezi | Jan. 16, 1940 |
| 2,222,516 | Powell | Nov. 19, 1940 |

FOREIGN PATENTS

| Number | Country | Date |
|---|---|---|
| 589,882 | Great Britain | July 2, 1947 |
| 688,072 | France | May 6, 1930 |